3,475,451
5-(HALO/ALKOXY)PHENYL-2-PYRROLEPROPION-
AMIDES AND CONGENERS
Leland J. Chinn, Morton Grove, Ill., assignor to G. D.
Searle & Co., Chicago, Ill., a corporation of Delaware
No Drawing. Filed Nov. 1, 1966, Ser. No. 591,096
Int. Cl. C07d 27/26, 27/20
U.S. Cl. 260—326.3    8 Claims

ABSTRACT OF THE DISCLOSURE

Preparation of the captioned compounds, such as N,1-bis(2-hydroxyethyl) - 5 - (p-methoxyphenyl)-2-pyrrolepropionamide, and their analgesic, anti-bacterial, and anti-algal properties is disclosed.

This invention relates to 5-(halo/alkoxy)phenyl-2-pyrrolepropionamides and congeners, and to processes for the preparation thereof. More particularly, this invention provides new, useful, and unobvious chemical compounds of the formula

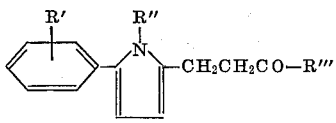

wherein R' represents halogen or an alkoxy radical, R" represents hydrogen or a hydroxyalkyl radical, and R'" represents an amino radical optionally substituted by a hydroxyalkyl grouping.

Among the halogens comprehended by R', fluorine, chlorine, and bromine, are especially preferred, while the alkoxy radicals comprehended thereby are most desirably methoxy, ethoxy, propoxy, isopropoxy, butoxy, isobutoxy, pentyloxy, neopentyloxy (i.e., 2,2-dimethylpropoxy), hexyloxy, isohexyloxy, heptyloxy, and like monovalent, saturated, acyclic, straight- or branched-chain groupings of empirical formula $$-OC_nH_{2n+1}$$

wherein $n$ represents a positive integer less than 8, and which are hereinafter termed lower alkoxy radicals. The positioning of the phenyl substituent represented by R' with respect to attachment of the phenyl nucleus to the pyrrole ring is not critical, ortho, meta, and para isomers alike being adapted to the purposes of this invention.

The hydroxyalkyl radicals comprehended by R" include hydroxymethyl, 1-hydroxyethyl, 1-methyl-1-hydroxyethyl, 2-hydroxyethyl, 1-methyl-2-hydroxyethyl, 1-hydroxypropyl, 2-hydroxypropyl, 3-hydroxypropyl, etc., among which 2-hydroxyethl is preferred.

The amino radicals comprehended by R'" include groupings of the formula

wherein Z represents hydrogen or a hydroxyalkyl radical as specified above.

The compounds to which this invention relates are useful by reason of their valuable pharmacological properties. Thus, for example, they are analgesic, they reduce serum triglyceride concentration, and they are selectively anti-bacterial and anti-algal, being effective against *Diplococcus pneumoniae* and *Chlorella vulgaris*, respectively.

Preparation of the subject compounds is variously accomplished, as follows: Heating a 2-pyrrolepropionic acid

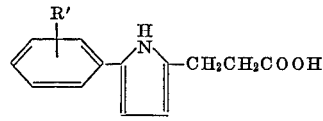

with urea at around 190° C. affords the corresponding propionamide

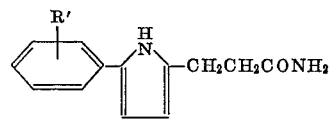

Heating a 2-pyrrolepropionic acid methyl ester

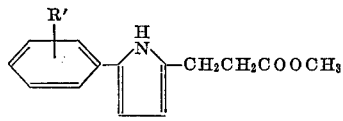

with an alkanolamine $$NH_2Z'$$

(wherein Z' represents a hydroxyalkyl radical comprehended by Z) at around 170° C. affords the corresponding N-hydroxyalkyl-2-pyrrolepropionamide

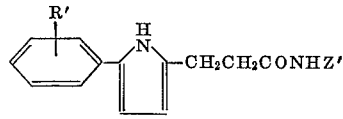

Heating a 1-hydroxyalkyl-2-pyrrolepropionic acid methyl ester

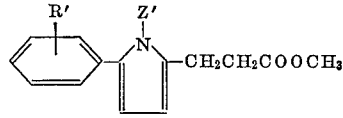

with liquid ammonia at around 100° C. in a sealed vessel affords the corresponding 1-hydroxyalkyl-2-pyrrolepropionamide

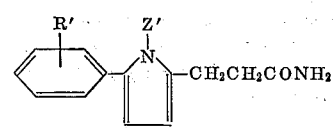

And, finally, heating a dioxoheptanoic acid

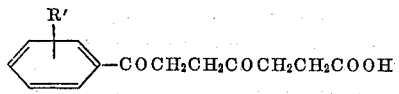

with an alkanolamine $$NH_2Z'$$

(Z' being defined as before) at around 170° C. affords the corresponding N,1 - bis(hydroxyalkyl)-2-pyrrolepropionamide

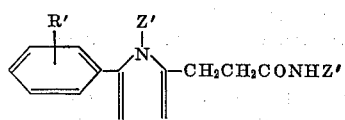

Throughout the foregoing formulas, R' retains the meaning originally assigned.

The following examples describe in detail compounds illustrative of the present invention and methods which have been devised for their preparation. However, the invention is not to be construed as limited thereby, either in spirit or in scope, since it will be apparent to those skilled in the art of organic synthesis that many modifications, both of materials and of methods, may be practiced without departing from the purpose and intent of this disclosure. Throughout the examples hereinafter set forth, temperatures are given in degrees centigrade and relative amounts of materials in parts by weight, except as otherwise noted.

EXAMPLE 1

5-(p-methoxyphenyl)-2-pyrrolepropionamide

A mixture of 1 part of 5-(p-methoxyphenyl)-2-pyrrolepropionic acid and 1 part of urea is maintained at 190–195° for 3 hours, then cooled to room temperature and extracted thereat with a mixture of ethyl acetate and 5% hydrochloric acid. The ethyl acetate phase is separated; washed successively with water, aqueous 5% sodium bicarbonate, and water; dried over anhydrous sodium sulfate; and stripped of solvent by vacuum distillation. The solid residue is washed by trituration with ether, then crystallized from aqueous ethanol to give 5-(p-methoxyphenyl)-2-pyrrolepropionamide melting at 172.5–175°. The product has the formula

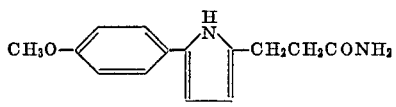

EXAMPLE 2

A. 1-(2-hydroxyethyl)-5-(p-methoxyphenyl)-2-pyrrolepropionic acid

A mixture of 200 parts of 7-(p-methoxyphenyl)-4,7-dioxoheptanoic acid, 2500 parts of 2-aminoethanol, and 15 parts of p-toluenesulfonic acid monohydrate is heated at 110° for 15 hours, then stripped of solvent by vacuum distillation. The residue is partitioned between ethyl acetate and water, The ethyl acetate phase is separated, washed with water, and extracted with aqueous 5% sodium hydroxide. The alkaline extract is acidified with approximately 20% hydrochloric acid, and the resultant mixture is extracted with ethyl acetate. The ethyl acetate extract is washed with water, dried over anhydrous sodium sulfate, and stripped of solvent by vacuum distillation. The residue is 1-(2-hydroxyethyl)-5-(p-methoxyphenyl)-2-pyrrolepropionic acid.

B. Methyl 1-(2-hydroxyethyl)-5-(p-methoxyphenyl)-2-pyrrolepropionate

A mixture of 100 parts of 1-(2-hydroxyethyl)-5-methoxyphenyl)-2-pyrrolepropionic acid, 1600 parts of methanol, and 37 parts of concentrated sulfuric acid is heated at the boiling point under reflux for 7 hours, then concentrated to one-fourth its initial volume by vacuum distillation. The residue is diluted with 10 volumes of water, and the resultant mixture is extracted with ethyl acetate. The ethyl acetate extract is consecutively washed with water, aqueous 5% sodium bicarbonate, and water, whereupon it is dried over anhydrous sodium sulfate and then stripped of solvent by distillation. The residue is methyl 1 - (2-hydroxyethyl)-5-(p-methoxyphenyl)-2-pyrrolepropionate.

C. 1-(2-hydroxyethyl)-5-(p-methoxyphenyl)-2-pyrrolepropionamide

A mixture of 10 parts of methyl 1-(2-hydroxyethyl)-5-(p-methoxyphenyl)-2-pyrrolepropionate and 136 parts of liquid ammonia is heated in a sealed vessel to 100° and maintained thereat for 15 hours. The ammonia is then evaporated. The residue is 1-(2-hydroxyethyl)-5-(p-methoxyphenyl)-2-pyrrolepropionamide, having the formula

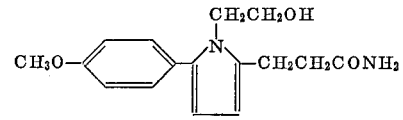

EXAMPLE 3

N-(2-hydroxyethyl)-5-(p-methoxyphenyl)-2-pyrrolepropionamide

A mixture of 9 parts of 5-(p-methoxyphenyl)-2-pyrrolepropionic acid and 240 parts of 2-aminoethanol is heated at the boiling point under reflux for 24 hours, then stripped of solvent by vacuum distillation. The residue is taken up in ethyl acetate. The ethyl acetate solution is washed with water, dried over anhydrous sodium sulfate, and stripped of solvent by vacuum distillation. The residue is N - (2-hydroxyethyl)-5-(p-methoxyphenyl)-2-pyrrolepropionamide, having the formula

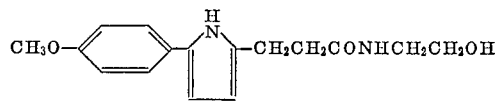

EXAMPLE 4

N,1-bis(2-hydroxyethyl)-5-(p-methoxyphenyl)-2-pyrrolepropionamide

A mixture of 184 parts of 7-(p-methoxyphenyl)-4,7-dioxoheptanoic acid and 5000 parts of 2-aminoethanol is heated at the boiling point under reflux for 24 hours, then stripped of solvent by vacuum distillation. The residue is partitioned between ethyl acetate and a saturated aqueous solution of sodium chloride. The ethyl acetate phase is separated, washed with saturated aqueous sodium chloride, dried over anhydrous sodium sulfate, and distilled in vacuo to the point of incipient precipitation. The distilland is chilled. The N,1-bis(2-hydroxyethyl)-5-(p-methoxyphenyl) - 2-pyrrolepropionamide thrown down, filtered off and dried in air, melts at 126.5–129.5°. The product has the formula

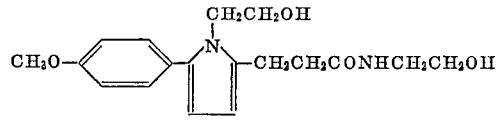

EXAMPLE 5

5-(m-ethoxyphenyl)-N,1-bis(2-hydroxyethyl)-2-pyrrolepropionamide

A mixture of 2 parts of 7-(m-ethoxyphenyl)-4,7-dioxoheptanoic acid and 50 parts of 2-aminoethanol is heated at the boiling point under reflux for 24 hours, then concentrated nearly to dryness by vacuum distillation. The residue is partitioned between ethyl acetate and water. The ethyl acetate phase is separated, washed successively with water and saturated aqueous sodium chloride, drived over anhydrous sodium sulfate, and freed of solvent by vacuum distillation. The residue is 5-(m-ethoxyphenyl) - N,1 - bis(2-hydroxyethyl)-2-pyrrolepropionamide, having the formula

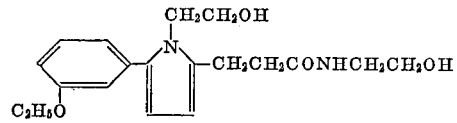

EXAMPLE 6

A. Methyl 5-(p-fluorophenyl)-2-pyrrolepropionate

A mixture of 300 parts of 5-(p-fluorophenyl)-2-pyrrolepropionic acid, 4000 parts of methanol, and 92 parts of concentrated sulfuric acid is heated at the boiling point under reflux for 7 hours, then concentrated to one-fourth its initial volume by vacuum distillation. The distilland is diluted with 10 volumes of water. The solid which precipitates is filtered off, washed with water, dried in air, and crystallized from a mixture of ether and hexane to give methyl 5-(p-fluorophenyl)-2-pyrrolepropionate melting at 117.5–119°.

B. 5-(p-fluorophenyl)-N-(2-hydroxyethyl)-2-pyrrolepropionamide

A mixture of 225 parts of methyl 5-(p-fluorophenyl)-2-pyrrolepropionate and 6000 parts of 2-aminoethanol is heated at the boiling point under reflux for 24 hours, then distilled nearly to dryness in vacuo. The residue is triturated with water, affording a solid which is filtered off, washed with water, dried in air, and crystallized from ethyl acetate to give 5-(p-fluorophenyl)-N-2-hydroxyethyl)-2-pyrrolepropionamide melting at 147.5–150.5°. The product has the formula

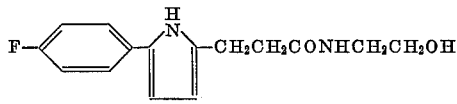

EXAMPLE 7

5-(p-fluorophenyl)-N,1-bis(2-hydroxyethyl)-2-pyrrolepropionamide

A mixture of 2 parts of 7-(p-fluorophenyl)-4,7-dioxoheptanoic acid and 50 parts of 2-aminoethanol is heated at the boiling point under reflux for 24 hours, then concentrated nearly to dryness by vacuum distillation. The residue is partitioned between ethyl acetate and water. The ethyl acetate phase is separated, washed with water, dried over anhydrous sodium sulfate, and stripped of solvent by vacuum distillation. The residue is crystallized from a mixture of ethyl acetate and ether to give 5-(p-fluorophenyl) - N,1 - bis(2-hydroxyethyl) - 2 - pyrrolepropionamide melting at approximately 119–120°. The product has the formula

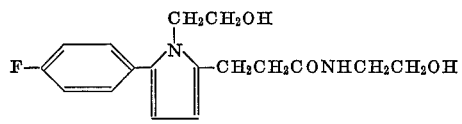

EXAMPLE 8

A. 4'-chloro-3-(2-furyl)acrylophenone

A solution consisting of 112 parts of p-chloroacetophenone, 96 parts of 2-furaldehyde, 15 parts of sodium methoxide, and 296 parts of methanol is allowed to stand at room temperatures for 16 hours. The solid precipitate which forms is filtered off, washed with aqueous 50% methanol, and dried in air. The product thus isolated is 4'-chloro-3-(2-furyl)acrylophenone.

B. 7-(p-chlorophenyl)-4,7-dioxoheptanoic acid

A mixture of 33 parts of 4'-chloro-3-(2-furyl)acrylophenone, 480 parts of ethanol, and 180 parts of concentrated hydrochloric acid is heated at the boiling point under reflux for 16 hours, then distilled to dryness in vacuo. The residue is mixed with 300 parts of glacial acetic acid, 360 parts of concentrated hydrochloric acid, and 600 parts of water. The resultant mixture is heated at the boiling point under reflux for 3 hours, then cooled to room temperature, at which point the supernatant solution is decanted from a black tar and chilled to 0°. The precipitate which forms is filtered off, washed with water, and dried in air. The product thus isolated is 7-(p-chlorophenyl)-4,7-dioxoheptanoic acid melting at 122–125°.

C. 5-(p-chlorophenyl)-N,1-bis(2-hydroxyethyl)-2-pyrrolepropionamide

A mixture of 2 parts of 7-(p-chlorophenyl)-4,7-dioxoheptanoic acid and 40 parts of 2-aminoethanol is heated at the boiling point under reflux for 24 hours, then distilled nearly to dryness in vacuo. The residue is partitioned between ethyl acetate and water. The ethyl acetate phase is separated, washed successively with water and aqueous saturated sodium chloride, dried over anhydrous sodium sulfate, and stripped of solvent by vacuum distillation. The residue is crystallized from a mixture of ethyl acetate and hexane to give 5-(p-chlorophenyl) - N,1 - bis(2 - hydroxyethyl) - 2 - pyrrolepropionamide melting at 129.5–134°. The product has the formula

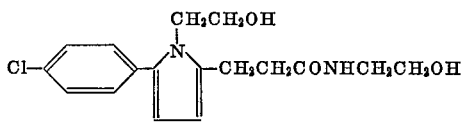

EXAMPLE 9

A. 3'-bromo-3-(2-furyl)acrylophenone

A solution consisting of 112 parts of m-bromoacetophenone, 96 parts of 2-furaldehyde, 15 parts of sodium methoxide, and 296 parts of methanol is allowed to stand at room temperatures for 16 hours. The precipitate which forms is filtered off, washed with aqueous 50% methanol, and dried in air. The product thus isolated is 3'-bromo-3-(2-furyl)acrylophenone.

B. 7-(m-bromophenyl)-4,7-dioxoheptanoic acid

A mixture of 33 parts of 3'-bromo-3-(2-furyl)-acrylophenone, 480 parts of ethanol, and 180 parts of concentrated hydrochloric acid is heated at the boiling point under reflux for 16 hours, then distilled to dryness by vacuum distillation. The residue is mixed with 360 parts of concentrated hydrochloric acid, 300 parts of glacial acetic acid, and 600 parts of water. The resultant mixture is heated at the boiling point under reflux for 3 hours, then cooled to room temperature. Supernatant solution is decanted from the black tar which forms and chilled to 0°. The precipitate thrown down is filtered off, washed with water, and dried in air. The product thus isolated is 7-(m-bromophenyl)-4,7-dioxoheptanoic acid.

C. 5-(m-bromophenyl)-N,1-bis(2-hydroxyethyl)-2-pyrrolepropionamide

A mixture of 2 parts of 7-(m-bromophenyl)-4,7-dioxoheptanoic acid and 40 parts of 2-aminoethanol is heated at the boiling point under reflux for 24 hours, then distilled nearly to dryness in vacuo. The residue is partitioned between ethyl acetate and water. The ethyl acetate phase is separated, washed successively with water and aqueous saturated sodium chloride, dried over anhydrous sodium sulfate, and stripped of solvent by vacuum distillation. The residue is 5-(m-bromophenyl)-N,1-bis(2-hydroxyethyl)-2-pyrrolepropionamide, having the formula

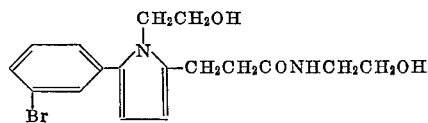

What is claimed is:
1. A compound of the formula

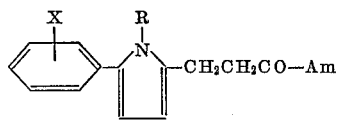

wherein R represents hydrogen or 2-hydroxyethyl, X represents halogen of atomic number less than 53 or lower alkoxy, and Am represents amino or 2-hydroxyethylamino.

2. A compound according to claim 1 which is 5-(p-methoxyphenyl)-2-pyrrolepropionamide.

3. A compound according to claim 1 wherein R represents 2-hydroxyethyl, X represents lower alkoxy, and Am represents 2-hydroxyethylamino.

4. A compound according to claim 1 which is N,1-bis(2 - hydroxyethyl) - 5 - (p-methoxyphenyl) - 2 - pyrrolepropionamide.

5. A compound according to claim 1 which is 5-(p-fluorophenyl) - N - (2 - hydroxyethyl)-2 - pyrrolepropionamide.

6. A compound according to claim 1 wherein R represents 2-hydroxyethyl, X represents halogen of atomic number less than 53, and Am represents 2-hydroxyethylamino.

7. A compound according to claim 1 which is 5-(p-fluorophenyl) - N,1 - bis(2 - hydroxyethyl) - 2 - pyrrolepropionamide.

8. A compound according to claim 1 which is 5-(p-chlorophenyl - N,1 - bis(2 - hydroxyethyl) - 2 - pyrrolepropionamide.

ALEX MAZEL, Primary Examiner.

J. TOVAR, Assistant Examiner

U.S. Cl. X.R.

260—999